Nov. 14, 1961

R. D. JUNKINS 3,008,889

CONTROL SYSTEMS

Filed Aug. 7, 1953

INVENTOR.

Raymond D. Junkins

Nov. 14, 1961 R. D. JUNKINS 3,008,889
CONTROL SYSTEMS
Filed Aug. 7, 1953 3 Sheets-Sheet 3

INVENTOR.
Raymond W. Junkins

United States Patent Office 3,008,889
Patented Nov. 14, 1961

3,008,889
CONTROL SYSTEMS
Raymond D. Junkins, Cleveland Heights, Ohio, assignor to Bailey Meter Company, a corporation of Delaware
Filed Aug. 7, 1953, Ser. No. 372,964
5 Claims. (Cl. 204—193.2)

My invention relates to the control of nuclear reactors and particularly where the thermal energy produced by nuclear fission, either primary or by-product, is employed in generating an elastic fluid supplied to a prime mover. As an example, water is vaporized, directly or secondarily, by the heat liberated in the reactor; the steam may be superheated, and then is expanded through a turbine to drive an electric generator.

In mobile service the requirements are to develop a maximum of power with a minimum of space and weight, including fuel storage. The turbine, or other prime mover, may drive the propulsion equipment directly. Submarines and other vessels may operate for a considerable length of time at a relatively uniform speed. On the other hand, trains, airplanes and stationary power plants may experience wide variations in load. My invention is equally applicable to both types of services.

The reactor is considered merely as a source of heat energy. When this heat is extracted by passing a fluid coolant through the reactor, the heat energy is then transferred via a heat exchange process to a vapor expander, such as a turbine, and the turbine produces useful work.

The invention is useful with the several reactor forms, such as the non-regenerative reactor in which fissionable material is consumed and heat energy is produced as a primary product; the breeder pile where thermal power is a by-product; as well as what is termed the homogeneous reactor. The particular design and structure may only modify certain features of my system of control to meet the design and operating characteristics of the reactor.

A principal object of the invention is to control the rate of operation of the prime mover by control of rate of vapor generation, utilizing the heat produced by nuclear fission.

Another object is to control the rate of supply, or rate of circulation, or the level, of a reactor heat exchange fluid to regulate the rate of vapor generation.

Another object is to control the final temperature of the generated vapor supplied to the prime mover.

Still another object is to minimize or prevent radiation leakage to the surrounding atmosphere, from a nuclear pile or reactor.

A further object is to provide means for exhausting the reactor container continuously to keep it at a lower pressure than the exterior, regardless of the atmospheric pressure of the exterior, or the hull submergence of a submarine.

Figure 3:
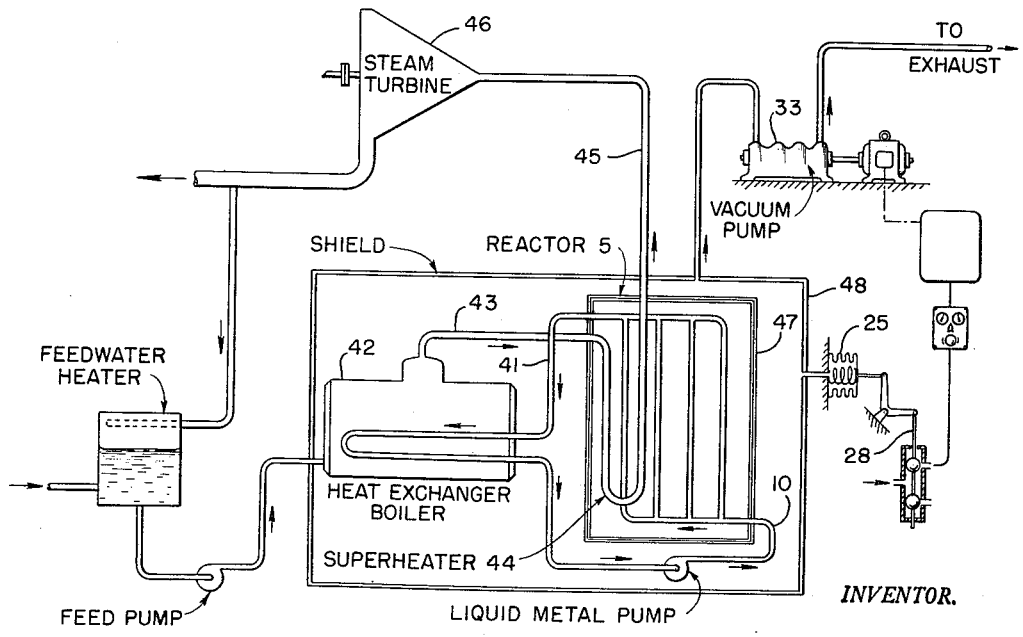

FIG. 3 diagrammatically illustrates the invention in connection with a somewhat different reactor-vapor generator assembly, useful in mobile or stationary power systems.

Figure 4:
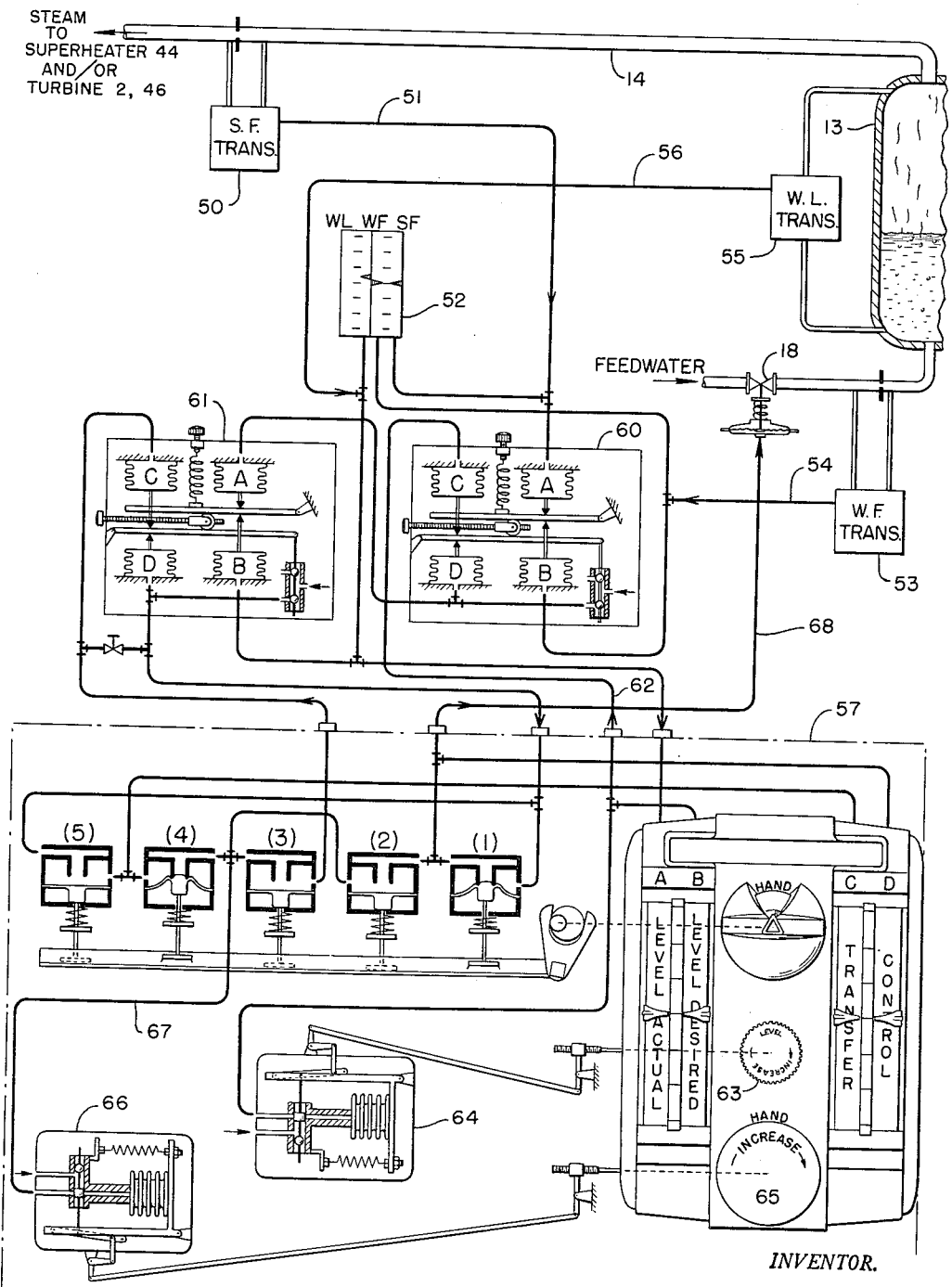

FIG. 4 diagrammatically illustrates a coolant fluid control system.

Figure 1:
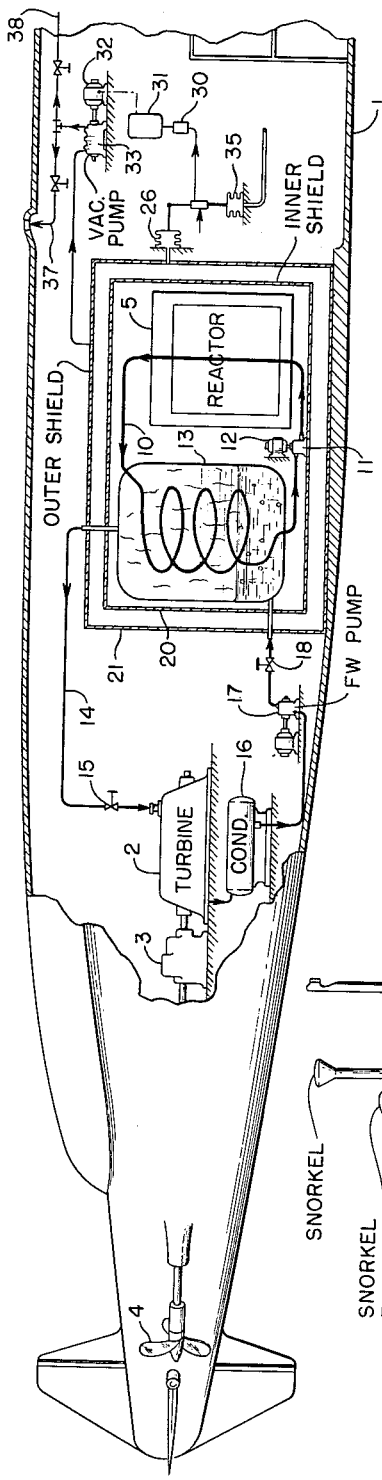
FIGS. 1 and 1A illustrate a submarine, in side elevation, with a portion of the hull broken away to disclose a diagrammatic showing of a nuclear reactor with vapor generator, propulsion equipment, auxiliaries, control panel, and principal interconnecting piping.
Figure 1A:
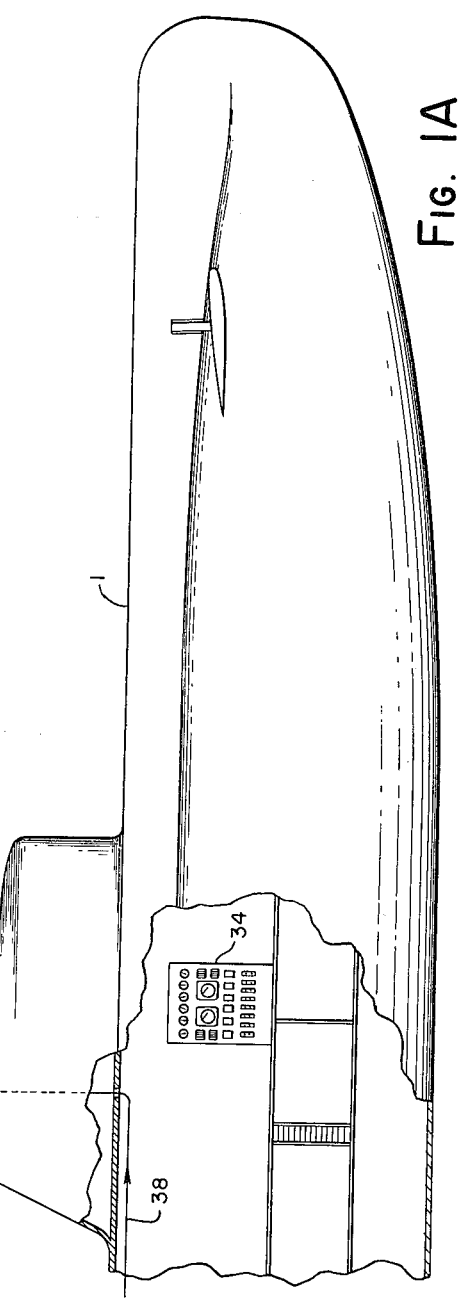

Referring now to FIGS. 1 and 1A I show therein an embodiment of my invention in connection with a submarine having a hull 1; and equipped with propulsion machinery including a steam turbine 2, reduction and reversing gears 3, and propellers 4. In the somewhat diagrammatic showing of FIGS. 1 and 1A I have not felt it necessary to show the equipment which is usual in a submarine and which is not involved in, or in connection with, my present invention.

I show quite diagrammatically, and not to any scale, a nuclear reactor 5 having, if needed, the usual moderator or reflector provisions as well as positionable control rods and control rod drive mechanism remotely controlled. These parts form no particular part of the present invention and are not illustrated, as being well understood by those skilled in the art.

The reactor is considered merely as a source of heat energy. When this heat is extracted by passing a coolant through the reactor, the heat energy is then transferred by way of a heat exchanger to a vapor expander prime mover, and the prime mover produces useful work. The reactor may be a slow or fast one and of the breeder or non-regenerative type.

Control of the reaction is effected by inserting in the pile some strips or rods of neutron-absorbing material such as cadmium or boron steel. When the pile is not in operation, several such rods are inserted in a number of slots, bringing the effective multiplication factor considerably below one. Usually at least one automatic control rod is provided and frequently two or more additional safety rods are provided. The control of the reaction controls the rate of heat liberation and thus becomes a control of steam generated for the turbine. If control of steam flow is desired, when there is uniform heat liberation in the pile, then some of the generated steam may be by-passed to the condenser and returned as feedwater.

To operate the reactor, all but one of the cadmium rods are taken out. The remaining one is then slowly pulled out. As the critical condition is approached, the intensity of the neutrons emitted by the pile begins to increase rapidly. For different positions of the rod in the pile the rate of heat liberation may be varied. It is relatively easy to keep the pile operating at a constant level of intensity and in most designs of reactor the heat level is self regulating. Movement of a rod is not necessarily linear with heat output of the pile although a cam relation may be introduced into the rod positioning as ascertained for each pile or each design of pile.

While the basic rate of heat liberation of the reactor is established by the proportioning and design of the assembly, as well as by the positioning of the control rods, there are other controllable factors, subsequent perhaps to the reactor per se, which may be utilized for finer gradations of control in ultimate vapor generation and utilization.

The coolant for the reactor is necessary to remove therefrom the heat generated by nuclear fission. In the present instance this heat is used to perform useful work. Present known coolants are ordinary distilled water, heavy water (serving also as a moderator), molten sodium or sodium-potassium alloy, as well as helium. Water is excellent for heat removal, but puts a low ceiling on steam pressure. It is not desirable to boil or vaporize within the reactor per se. If ordinary distilled water is utilized as a primary coolant then it must be prevented from vaporizing and this may only be done by elevating its pressure, if heat is to be absorbed by the water in any material degree. The liquid metals provide excellent heat transfer materials except for handling hazards.

In any of the present day reactor designs, with most of the known coolants, only the reactor itself and the primary coolant cycle need be shielded to retain radioactivity. It is not usually feasible to use the primary coolant directly in the turbine, not only because it is undesirable to vaporize the coolant directly in the reactor but because of its radioactivity. If a two-stage or three-stage heat exchange system is utilized it is usually sufficient to shield or contain radioactivity of the first and a portion of the second heat interchange cycles and desirably to retain within a shield the principal radioactivity by a shield which is around the primary coolant circuit and reactor.

The sodium-potassium alloy, as a primary coolant cycle, is favorable to reactor temperatures of 1000–1500° F. and thus allow secondary steam generation at a useful pressure and temperature level. These metals have low melting points, high boiling points, are stable thermally and have suitable nuclear and heat-transfer characteristics. They have good thermal conductivity and good wetting characteristics. Slightly lighter than water end of similar viscosity they require comparable power for pumping. One shortcoming is comparatively low specific heat requiring weight flows of metal greater than water to remove the same quantity of heat with the same temperature difference.

In the so-called homogeneous reactor the circulating slurry contains the uranium fuel which fissions, mixed with heavy water, that serves as the moderator which makes the reaction possible. No separate or intermediate coolant is required. The heavy water acting as a coolant to carry heat to the steam generator.

These different constructions and methods of operation, while forming no part of the present invention per se, are recited to later indicate that my present invention is equally as applicable to one form or type of operation as to another.

Again referring specifically to FIGS. 1 and 1A, I show quite diagrammatically at 10 a primary coolant cycle having a pump 11 driven by a motor 12. It is not important at the moment to specify what fluid is circulated in the primary coolant cycle 10 nor how the speed of circulation, by way of pump motor 12, is accomplished or responsive to what variables. Diagrammatically, the cycle 10 passes through the reactor 5, absorbs heat from the nuclear fission reaction, and the cycle tube 10 passes through a pressure container 13 where heat is transferred to vaporize water and possibly to superheat the resulting vapor. Speed of the pump 11 may be regulated to vary the rate of heat carried from the reactor 5 to the steam boiler 13. If the rate of circulation of the primary coolant, through cycle 10 is slowed down, the heat will not be carried away as fast (from the reactor) and the reactor temperature, as well as that of the primary coolant, will rise.

Steam generated, and possibly superheated, in the pressure vessel 13, is discharged through a pipe 14, having a throttle valve 15, to the turbine 2. Steam exhausted from the turbine diagrammatically passes to a condenser 16 and condensate is fed to the drum 13 by way of a motor-driven feedwater pump 17 and control valve 18. It appears unnecessary to detail water storage and make-up provisions between the condenser 16 and the feedwater control valve 18. Control of the feedwater pump speed as well as of the positioning of valve 18 will be referred to later.

In general, the heat produced by nuclear fission in reactor 5 is carried therefrom by the primary coolant cycle 10 and heat is transferred, within the pressure vessel 13, to the secondary coolant cycle comprising water, desirably vaporized and superheated, with the resultant steam expanded through the prime mover to ultimately drive the propellers 4.

The embodiment of FIGS. 1 and 1A is in connection with a submarine. It is illustrative of the usual mobile power plants for surface vessels, airplanes, locomotives, and the like. Submarines and airplanes, however, have the additional problem of elevation relative to sea level. I will describe my invention particularly in connection with the submarine embodiment illustrated.

Figure 2:
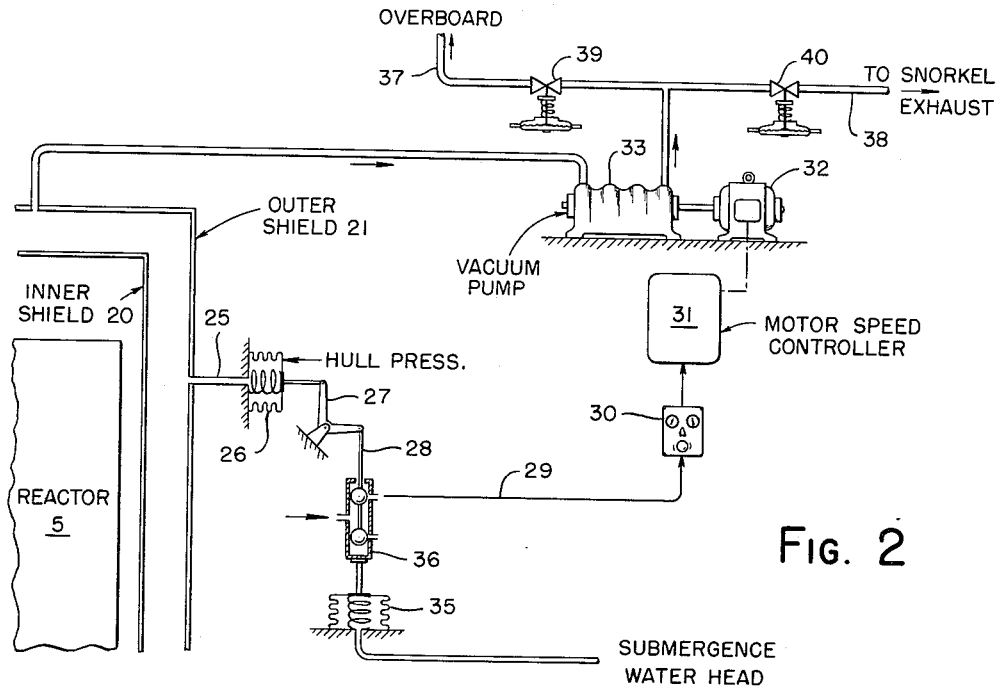
FIG. 2 is a more detailed showing of a portion of the control of FIGS. 1 and 1A.

It is most desirable that the reactor 5 and at least the primary coolant cycle 10 be shielded to prevent radioactivity from being transmitted or dissipated into the hull 1 of the submarine. I thus provide an inner shield 20 and an outer shield 21, of known material, completely encasing the reactor 5, primary coolant cycle 10, vapor generating chamber 13, as well as the primary coolant pump 11 and its drive motor 12. While pump 11 has been shown as a more or less conventional type it will be appreciated that, particularly for the liquid metals, a special type such as the electromagnetic or similar pump may desirably be utilized. FIG. 2 shows in greater detail the control of my invention in connection with the general arrangement of FIGS. 1 and 1A.

In general I desirably evacuate the space between the inner shield 20 and the outer shield 21 to an absolute pressure slightly below the hull interior pressure (ambient pressure) surrounding the shielded assembly. The evacuated products, from the space between the shields, is discharged without the hull 1. Thus, any air leakage tendency from within the inner shield 20, or from the space between the shields 20, 21, to the space within the hull 1 ambient to the outer shell 21, is prevented. Even dust-free and moisture-free air within the shields 20, 21 may be made radioactive and would be hazardous to the health of humans and perhaps to materials, within the hull 1. By continually evacuating the space between the shield 20 and the shield 21 the tendency is for air ambient to the shield 21 to leak inwardly and to prevent any outward leakage.

When I speak of "ambient" pressure or temperature, I mean that pressure or temperature "ambient to" or "adjacent" the particular apparatus under discussion and within the hull or other confined space in which the apparatus may be located. It is intended to mean that pressure or temperature within the submarine hull, airplane body, or other confined space and in the present submarine embodiment it might be termed "the hull interior" pressure or temperature.

The space between the shields 20 and 21 is connected by a pipe 25 to the interior of a spring-loaded bellows 26 subjected on its exterior to the hull interior, or ambient, pressure. Thus, the positioning of the movable head of bellows 26 is always in accordance with the differential between the inter-shield space and the hull interior pressure, with the adjustable spring loading establishing the desired differential, to the end that the inter-shield pressure will always be a predetermined amount below the hull interior pressure.

The movable head of bellows 26 is arranged, through a bell crank 27, to position the movable element 28 of a pilot valve similar to the type disclosed and claimed in the Johnson Patent 2,054,464, continuously establishing in a pipe 29 a fluid loading pressure representative of pressure differential between the shield inter-space and the hull interior.

Pipe 29 joins a manual-automatic selector station 30 whose output acts upon a motor speed controller 31 for regulating the speed of a motor 32 driving an exhaust pump 33. The selector station 30 may be located upon the control panel 34 (FIG. 1A) allowing either automatic motor speed control, or remote manual motor speed control, of the vacuum pump 33.

The system of FIG. 2 includes a spring-loaded bellows 35 subjected on its interior to hull submergence water head and on its exterior to hull interior pressure. On account of human occupancy the hull interior pressure is maintained as substantially uniform as possible so that the bellows 35 is substantially directly responsive to submergence water head. It is arranged to position a second cooperating movable element 36 of the pilot valve thus compensating vacuum pump speed for the submergence head or pressure against which it must discharge either overboard through pipe 37 or to the snorkel exhaust through pipe 38.

A valve 39 controls discharge through pipe 37 while a valve 40 controls discharge through the pipe 38. These two valves are shown in FIG. 1 as hand adjustable and in FIG. 2 as being positionable responsive to fluid loading pressures which may be manually established remotely from the control panel 34. Preferably, under snorkel operation, valve 39 is closed and valve 40 is open, with bellows 35 substantially ineffective due to a minimum of submergence pressure head. Under submerged operation, valve 40 is closed and valve 39 is open and, upon increasing submergence, the vacuum pump 33 is automatically speeded up in accordance with the submergence head against which it must pump.

It will be understood that a snorkel is a breathing device used by a submarine and may include a tube, or a pair of tubes, housing air intake as well as air and gas exhaust pipes that can be extended above the surface of the water for allowing operation when the submarine is barely submerged. The arrangement allows discharge of exhaust air and gases at all times without entry of water when waves submerge the exhaust port. The inlet port allows air entrance to the hull when not covered by a wave but closes against water entry when the port is submerged by a wave. Snorkel operation is had when the submarine is barely submerged, with only the periscope, snorkel, and similar apparatus of minimum visibility exposed but subject to wave submergence. There are, in a submarine, three normal types of operation, namely, surface operation, snorkel operation, and complete submergence.

In general, it may be said that the gases exhausted from the inter-shield space are discharged outside of the hull 1. This may be by the overboard pipe 37, or the snorkel exhaust pipe 38, and the speed of the exhaust pump 33 is continuously automatically controlled to maintain inter-shield pressure a predetermined amount below the hull interior pressure and irrespective as to submergence water head. The operation is independent of the nature and arrangement of apparatus and heat exchange cycles within the shields 20, 21.

In FIG. 3 I illustrate a slight modification of the invention previously described, applicable not only to mobile power units, but to stationary power systems wherein it is still desirable to exhaust possible radioactive gases from within a shielded apparatus to some point of safety a distance away, such for example as to a stack.

Herein, the reactor 5 has a primary heat exchange cycle 10 which may preferably be of the sodium-potassium liquid metal type, the heated liquid passing through a pipe 41 in heat exchange relation (within a pressure chamber 42) to vaporize water in the chamber 42 at substantial pressure. Steam from the the chamber 42 passes through a pipe 43 to a superheater loop 44 located within the reactor 5, and the highly superheated steam of the secondary fluid cycle leaves through a pipe 45 to supply a steam turbine 46. The reactor 5 is provided with a shield 47 and the assembly of reactor 5, primary coolant cycle 41, and heat exchanger 42, as well as superheater loop 44, are all enclosed in a secondary shield 48.

The space within the shield 48 is joined to the interior of bellows 25, arranged to position the movable element 28 of a pilot valve controlling the vacuum pump 33. In this embodiment the ambient pressure acting on the exterior of bellows 25 is usually only affected by barometric changes. There is no submergence water head compensation necessary on the pilot valve 28. The operation of the system as a whole is substantially like that described in connection with FIG. 2.

In FIG. 4 I show in greater detail the feedwater control system in connection with FIG. 1, and which may equally as well be adapted to the arrangement of FIG. 3. Steam generated in the pressure chamber 13 discharges through the pipe 14 to either a turbine 2 (FIG. 1) or the superheater 44 and turbine 46 of FIG. 3. Flow rate is continually measured of the steam passing through conduit 14 by a steam flow measuring transmitter 50 establishing in a pipe 51 a pneumatic loading pressure continuously representative of rate of steam flow and which is indicated at SF on a comparison indicating gage 52 conveniently located on the panel 34.

Feedwater supply through the control valve 18 is measured by a rate meter 53 establishing in a pipe 54 a pneumatic loading pressure continuously representative of rate of flow of feedwater supplied to the pressure chamber 13.

Level of liquid within the chamber 13 is sensed by a water level responsive transmitter 55 establishing in a pipe 56 a pneumatic loading pressure continuously representative of liquid level. The water flow rate and the liquid level value are also indicated, by way of the indicator 52, upon control panel 34. Likewise a manual-automatic selector station 57 is located upon the control panel 34, providing there a possibility of selectively remotely manually controlling the feedwater supply valve 18, or selectively allowing the valve 18 to be automatically controlled in accordance with desired interrelation of steam flow rate, water flow rate, and liquid level within the chamber 13. As will be explained, the selector station 57, described in Dickey Patent 2,747,595, issued May 29, 1956, and assigned to the same assignee, additionally provides the possibility of setting (remotely) the desired water level to be maintained. Through this agency the submergence, within chamber 13, of the amount of primary coolant pipe 10, may be varied and thus the extent of heat exchange surface contacted by the liquid to be vaporized in chamber 13.

It will be seen, referring to FIG. 4, that the pipe 51 joins the A chamber of a ratio relay 60 to whose B chamber is joined with pipe 54. The A and B chambers oppose upon a force balance system, thus continuously comparing the rate of flow of steam with the rate of flow of water input. If water is not being supplied at the same rate that steam is being discharged then a loading pressure (in the D chamber of relay 60) is established, which is transmitted to enter the A chamber of a second relay 61. The B chamber of relay 61 receives the fluid loading pressure of pipe 56 representative of water level. The output of relay 61, produced in the D chamber, is effective in positioning the regulating valve 18 when selector station 57 is in the "automatic" position of operation. Under "automatic" operation a loading pressure, effective through a pipe 62, upon the C chamber of relay 60, may be established by the "Level" knob 63 of the station 57 acting upon a pilot arrangement 64. Thus the relay 60 is loaded, or biased, as to its output effective within the A chamber of relay 61, in accordance with the desired level of liquid in chamber 13. This same biasing or remote set point pressure of pipe 62 is effective upon the B indicator on the face of station 57 indicating the "Level-desired" in comparison with the A indicator of "Level-actual."

When the selector station 57 is turned to its "Hand" position (as shown in FIG. 4) then the relays 60, 61 are blocked from the selector station 57 and, through the agency of "Hand" knob 65 a control pressure is established through device 66, pipe 67, valve (2) and pipe 68, to remotely manually position the valve 18 regulating the rate of supply of feedwater to the boiler 13.

It will thus be evident that, from the control panel 34, I may selectively place control of feedwater supply to the boiler 13 under automatic control by continuous comparison of steam flow, water flow and readjustment by actual water level; manually set by the knob 63. I may selectively, from the panel 34, take the feedwater supply valve 18 from automatic and manually remotely control the level to any desired value by means of the selector station 57.

Through control of the rate of supply of feedwater to the drum 13 and/or the level of water within the drum, I may vary the rate of evaporation of steam therein, or the total superheated temperature of the steam passing out through the pipe 14. It will be apparent that while I have described this arrangement of FIG. 4 in connection with the boiler 13 of FIG. 1, it is equally applicable to the vaporizing boiler 42 of FIG. 3.

While I have illustrated and described certain preferred embodiments of my invention it will be understood that this is by way of example only.

What I claim as new, and desire to secure by Letters Patent of the United States, is:

1. In a thermal energy generator of a power plant utilizing controlled nuclear fission of a reactor and located within the hull of a mobile equipment, the combination comprising, first closed cycle apparatus having circulated fluid arranged to abstract heat from the reactor, second closed cycle apparatus containing liquid and vapor generated from the liquid with a portion of the two cycles overlapping in heat exchange relation, a liquid-vapor interface occurring in the overlap, a commercially gas tight container for the reactor, the first cycle apparatus, and at least the overlap of the second cycle, exhausting means connected to the interior of the container, and discharging at a substantial distance therefrom, a bellows sensitive to the differential of the pressure within the container and the pressure within the hull, and a pilot valve actuated by said bellows to produce a fluid loading pressure to control said exhausting means to maintain a desired differential pressure between the container and the hull.

2. In a control system for controlling the generation of vapor in a power plant having a nuclear reactor utilizing controlled nuclear fission to provide a heat source and a power means utilizing the generator vapor, the combination comprising, a first closed fluid cycle containing a coolant fluid for the reactor which is circulated through the reactor to abstract heat therefrom, a second closed fluid cycle containing liquid and vapor and having a liquid vapor interface in a portion thereof in which liquid is vaporized, a heat exchanger in which a portion of said first cycle overlaps said liquid vapor interface portion of said second cycle in indirect heat exchange relationship therewith to effect transfer of heat to said overlapping portion of said second cycle, the rate of vapor generation in said second cycle being dependent on the position of the liquid vapor interface, means for supplying vapor generated in said second cycle to the power means, means for supplying liquid to the liquid vapor interface portion of said second cycle, and means responsive to demand for vapor by the power means for controlling said liquid supply means to thereby control the location of the liquid vapor interface and the rate of vapor generation.

3. In a control system for controlling the generation of vapor in a power plant having a nuclear reactor utilizing controlled nuclear fission to provide a heat source and a power means utilizing the generated vapor, the combination comprising, a first closed cycle containing a coolant fluid for the reactor which is circulated through the reactor to abstract heat therefrom, a second closed cycle containing liquid and vapor and having a liquid vapor interface in a portion thereof in which liquid is vaporized, a heat exchanger in which a portion of said first cycle overlaps said liquid vapor interface portion of said second cycle in indirect heat exchange relationship therewith to effect transfer of heat from said portion of said first cycle to said portion of said second cycle, the rate of vapor generation in said second cycle being dependent on the position of said liquid vapor interface, means for supplying vapor generated in said second cycle to the power means, means for supplying liquid to the liquid vapor interface portion of said second cycle, means responsive to the demand for vapor by the power means for controlling said liquid supply means to thereby control the location of said liquid vapor interface, and means responsive to variations in the location of said liquid vapor interface cooperative with said demand responsive means to control said liquid supply means.

4. In a thermal energy generator utilizing controlled nuclear fission of a reactor, control apparatus including in combination, first closed-cycle apparatus having circulated fluid arranged to abstract heat from the reactor, second closed-cycle apparatus containing liquid and vapor generated therefrom with a portion of the two cycles overlapping in heat exchange relation, a liquid-vapor interface of the second closed-cycle occurring in the overlap, liquid level means sensitive to interface location, vapor flow rate measuring means of the vapor generated in the second cycle, liquid flow rate measuring means of the liquid supply rate to the overlap portion of the second cycle, and control means for said liquid supply rate conjointly responsive to said liquid level means and vapor flow measuring means and liquid flow rate measuring means.

5. In a thermal energy generator utilizing controlled nuclear fission of a reactor, control apparatus including in combination, first closed-cycle apparatus having circulated fluid arranged to abstract heat from the reactor, second closed-cycle apparatus containing liquid and vapor generated therefrom with a portion of the two cycles overlapping in heat exchange relation, a liquid-vapor interface of the second closed-cycle occurring in the overlap, liquid level means sensitive to interface location, vapor flow rate measuring means of the vapor generated in the second cycle, liquid flow rate measuring means of the liquid supply rate to the overlap portion of the second cycle, means continuously comparing the vapor flow rate with the liquid flow rate and producing a first fluid pressure signal continuously representative of the relation between such rates, manually adjustable means establishing a second fluid pressure signal arranged to bias the first signal representing a desired liquid level interface location, the liquid level means providing a third fluid pressure signal continuously representative of such actual liquid level, second comparing means receiving the first fluid pressure signal and the third signal and producing a fourth fluid pressure signal continuously representative of the relation between actual liquid level and desired liquid level, and control means for said liquid supply rate regulated by the fourth fluid pressure signal to return actual liquid level to desired level upon departure therefrom.

References Cited in the file of this patent

UNITED STATES PATENTS

| | | |
|---|---|---|
| 1,944,059 | Baumann | Jan. 16, 1934 |
| 2,270,094 | Veenschoten | Jan. 13, 1942 |
| 2,563,374 | Rosenberger | Aug. 7, 1951 |
| 2,643,520 | Powell | June 30, 1953 |
| 2,671,817 | Groddeck | Mar. 9, 1954 |

FOREIGN PATENTS

| | | |
|---|---|---|
| 957,571 | France | Aug. 29, 1949 |

OTHER REFERENCES

Nucleonics (June 1953), pp. 53–55.

The Science and Engineering of Nuclear Power, vol. II, Clark Goodman, published by Addison-Wesley Press, Cambridge, Mass., 1949, pp. 281–286.

Nucleonics, January 1951, vol. 8, No. 1, pp. 3–5.

Atomics, vol. 6, No. 1, pp. 18–24, January 1950.

Nucleonics, vol. 10, No. 9, September 1952, pp. 11, 12.